US011783128B2

(12) United States Patent
Manandise et al.

(10) Patent No.: US 11,783,128 B2
(45) Date of Patent: Oct. 10, 2023

(54) FINANCIAL DOCUMENT TEXT CONVERSION TO COMPUTER READABLE OPERATIONS

(71) Applicant: Intuit Inc., Mountain View, CA (US)

(72) Inventors: Esmé Manandise, Tallahassee, FL (US); Per-Kristian G. Halvorsen, Los Altos Hills, CA (US)

(73) Assignee: Intuit Inc., Mountain View, CA (US)

( * ) Notice: Subject to any disclaimer, the term of this patent is extended or adjusted under 35 U.S.C. 154(b) by 434 days.

(21) Appl. No.: 16/795,443

(22) Filed: Feb. 19, 2020

(65) Prior Publication Data
US 2021/0256210 A1 Aug. 19, 2021

(51) Int. Cl.
*G06F 40/284* (2020.01)
*G06F 40/205* (2020.01)
(Continued)

(52) U.S. Cl.
CPC .......... *G06F 40/284* (2020.01); *G06F 40/205* (2020.01); *G06F 40/58* (2020.01); *G06V 30/414* (2022.01); *G06V 30/416* (2022.01)

(58) Field of Classification Search
CPC ...... G06F 40/284; G06F 40/205; G06F 40/58; G06F 40/111; G06F 40/157;
(Continued)

(56) References Cited

U.S. PATENT DOCUMENTS

| 5,555,169 A | 9/1996 | Namba et al. |
| 6,246,977 B1 | 6/2001 | Messerly et al. |

(Continued)

FOREIGN PATENT DOCUMENTS

| JP | 2013164740 A | 8/2013 |
| KR | 101585029 B1 | 1/2016 |

(Continued)

OTHER PUBLICATIONS

Zhai et al., "Machine Translation by Modeling Predicate-Argument Structure Transformation," Proceedings of COLING 2012: Technical Papers, pp. 3019-3036, COLING 2012, Mumbai, Dec. 2012.

(Continued)

*Primary Examiner* — Thierry L Pham
(74) *Attorney, Agent, or Firm* — Paradice & Li LLP

(57) ABSTRACT

This disclosure provides systems, methods and apparatuses for converting natural language text in financial documents to mathematical operations for a financial management program. In some implementations, a computing device may obtain a first segment of computer readable text associated with a text capture in a financial document, parse only a portion of the first segment to generate a parsed segment, and determine translation information associated with the parsed segment to translate the parsed segment. The computing device may also store the parsed segment and the translation information in a data structure in memory, translate the parsed segment in the data structure based on the translation information, and output one or more computer readable mathematical operations corresponding to the translated segment. In this manner, the computing device may output the one or more computer readable mathematical operations without parsing all of the segment.

17 Claims, 5 Drawing Sheets

(51) Int. Cl.
  *G06F 40/58* (2020.01)
  *G06V 30/414* (2022.01)
  *G06V 30/416* (2022.01)

(58) Field of Classification Search
  CPC ... G06F 40/242; G06F 40/268; G06V 30/414; G06V 30/416
  USPC .......................................................... 704/9
  See application file for complete search history.

(56) References Cited

U.S. PATENT DOCUMENTS

| | | |
|---|---|---|
| 6,912,536 B1 | 6/2005 | Ochitani |
| 7,092,922 B2 | 8/2006 | Meng et al. |
| 7,234,103 B1 | 6/2007 | Regan |
| 7,251,781 B2 | 7/2007 | Batchilo et al. |
| 7,254,569 B2 | 8/2007 | Goodman et al. |
| 7,343,551 B1 | 3/2008 | Bourdev |
| 7,500,178 B1 | 3/2009 | O'Donnell |
| 7,561,734 B1 | 7/2009 | Wnek |
| 7,660,779 B2 | 2/2010 | Goodman et al. |
| 7,765,097 B1 | 7/2010 | Yu et al. |
| 7,788,262 B1 | 8/2010 | Shirwadkar |
| 7,853,494 B2 | 12/2010 | Wyle |
| 8,032,822 B1 | 10/2011 | Artamonov et al. |
| 8,082,144 B1 | 12/2011 | Brown et al. |
| 8,214,362 B1 | 7/2012 | Djabarov |
| 8,370,143 B1 | 2/2013 | Coker |
| 8,515,972 B1 | 8/2013 | Srikrishna et al. |
| 8,606,665 B1 | 12/2013 | Shaw |
| 8,655,695 B1 | 2/2014 | Qu et al. |
| 8,756,489 B2 | 6/2014 | Richardt et al. |
| 9,069,745 B2 | 6/2015 | Jacobsen et al. |
| 9,430,453 B1 | 8/2016 | Ho |
| 9,652,562 B2 | 5/2017 | Barrus |
| 9,892,106 B1 | 2/2018 | Lesner et al. |
| 10,810,685 B1 | 10/2020 | Pei et al. |
| 10,970,190 B2 | 4/2021 | Kamran et al. |
| 11,163,956 B1 | 11/2021 | De Peuter et al. |
| 2002/0083068 A1 | 6/2002 | Quass et al. |
| 2003/0026459 A1 | 2/2003 | Won et al. |
| 2003/0036912 A1 | 2/2003 | Sobotta et al. |
| 2003/0233296 A1 | 12/2003 | Wagner |
| 2004/0030540 A1 | 2/2004 | Ovil et al. |
| 2004/0039988 A1 | 2/2004 | Lee et al. |
| 2005/0108406 A1 | 5/2005 | Lee et al. |
| 2005/0108630 A1 | 5/2005 | Wasson et al. |
| 2005/0125746 A1 | 6/2005 | Viola et al. |
| 2005/0235811 A1 | 10/2005 | Dukane |
| 2005/0257148 A1 | 11/2005 | Goodman et al. |
| 2005/0267869 A1 | 12/2005 | Horvitz et al. |
| 2006/0062451 A1 | 3/2006 | Li et al. |
| 2006/0111990 A1 | 5/2006 | Cohen et al. |
| 2006/0155539 A1 | 7/2006 | Chen et al. |
| 2006/0178961 A1 | 8/2006 | Stanley et al. |
| 2006/0182554 A1 | 8/2006 | Stoizer |
| 2006/0184870 A1 | 8/2006 | Christen et al. |
| 2006/0235811 A1 | 10/2006 | Fairweather |
| 2006/0242180 A1 | 10/2006 | Graf et al. |
| 2007/0112553 A1 | 5/2007 | Jacobson |
| 2007/0129935 A1 | 6/2007 | Uchimoto et al. |
| 2007/0130134 A1 | 6/2007 | Ramsey et al. |
| 2007/0299949 A1 | 12/2007 | Macbeth et al. |
| 2008/0065634 A1 | 3/2008 | Krinsky |
| 2008/0104506 A1 | 5/2008 | Farzindar |
| 2008/0147528 A1 | 6/2008 | Talan et al. |
| 2008/0154824 A1 | 6/2008 | Weir et al. |
| 2008/0227075 A1 | 9/2008 | Poor et al. |
| 2008/0270110 A1 | 10/2008 | Yurick et al. |
| 2008/0313174 A1 | 12/2008 | Barve et al. |
| 2009/0024382 A1 | 1/2009 | Wolvaardt |
| 2009/0089046 A1 | 4/2009 | Uchimoto et al. |
| 2009/0119107 A1 | 5/2009 | Duncan |
| 2009/0119234 A1 | 5/2009 | Pinckney et al. |
| 2009/0182554 A1 | 7/2009 | Abraham et al. |
| 2009/0204881 A1 | 8/2009 | Murthy et al. |
| 2009/0276729 A1 | 11/2009 | Cantu-Paz |
| 2009/0327513 A1 | 12/2009 | Guo et al. |
| 2010/0005096 A1 | 1/2010 | Minagawa et al. |
| 2011/0087671 A1 | 4/2011 | Lee et al. |
| 2011/0258182 A1 | 10/2011 | Singh et al. |
| 2011/0271173 A1 | 11/2011 | Ait-Mokhtar et al. |
| 2012/0089659 A1 | 4/2012 | Halevi et al. |
| 2012/0272160 A1 | 10/2012 | Spivack et al. |
| 2013/0013612 A1 | 1/2013 | Fittges et al. |
| 2014/0019433 A1 | 1/2014 | Effrat et al. |
| 2014/0122988 A1 | 5/2014 | Eigner et al. |
| 2014/0164352 A1 | 6/2014 | Denninghoff |
| 2014/0173406 A1 | 6/2014 | Robelin et al. |
| 2014/0201126 A1 | 7/2014 | Zadeh et al. |
| 2014/0207782 A1 | 7/2014 | Ravid |
| 2014/0223277 A1 | 8/2014 | Kimber et al. |
| 2014/0258825 A1 | 9/2014 | Ghosh et al. |
| 2014/0280166 A1 | 9/2014 | Bryars et al. |
| 2014/0282586 A1 | 9/2014 | Shear et al. |
| 2015/0007007 A1 | 1/2015 | Bryon et al. |
| 2015/0046785 A1 | 2/2015 | Byron et al. |
| 2015/0058188 A1 | 2/2015 | Bartlett et al. |
| 2015/0095753 A1 | 4/2015 | Gajera et al. |
| 2015/0127567 A1 | 5/2015 | Menon et al. |
| 2015/0206067 A1 | 7/2015 | Abu-Mostafa et al. |
| 2015/0254225 A1 | 9/2015 | Chirca |
| 2015/0309992 A1 | 10/2015 | Visel |
| 2015/0317295 A1 | 11/2015 | Sherry et al. |
| 2016/0019197 A1 | 1/2016 | Iasi et al. |
| 2016/0092557 A1 | 3/2016 | Stojanovic et al. |
| 2016/0117542 A1 | 4/2016 | Klappert et al. |
| 2017/0075873 A1 | 3/2017 | Shetty et al. |
| 2017/0220540 A1 | 8/2017 | Wang et al. |
| 2017/0228655 A1 | 8/2017 | Alarie et al. |
| 2017/0239576 A1 | 8/2017 | Hsiao |
| 2017/0293607 A1 | 10/2017 | Kolotienko et al. |
| 2017/0337176 A1 | 11/2017 | Cietwierkowski et al. |
| 2018/0018310 A1 | 1/2018 | Unsal |
| 2018/0018311 A1 | 1/2018 | Mukherjee et al. |
| 2018/0018322 A1* | 1/2018 | Mukherjee ............... G06F 8/30 |
| 2018/0018582 A1 | 1/2018 | Unsal et al. |
| 2018/0018676 A1 | 1/2018 | Mukherjee et al. |
| 2018/0018740 A1 | 1/2018 | Unsal et al. |
| 2018/0018741 A1 | 1/2018 | Mukherjee et al. |
| 2018/0032497 A1 | 2/2018 | Mukherjee et al. |
| 2018/0053120 A1 | 2/2018 | Mukherjee et al. |
| 2018/0098737 A1 | 4/2018 | Villazon-Terrazas et al. |
| 2018/0113859 A1* | 4/2018 | Kodimer ............... G06F 40/58 |
| 2018/0121337 A1 | 5/2018 | Unsal et al. |
| 2018/0268167 A1 | 9/2018 | Alberton et al. |
| 2018/0341839 A1 | 11/2018 | Malak et al. |
| 2019/0065460 A1 | 2/2019 | Xin et al. |
| 2019/0080627 A1 | 3/2019 | Dey et al. |
| 2020/0151246 A1 | 5/2020 | Mwarabu |
| 2020/0159990 A1 | 5/2020 | Mukherjee et al. |
| 2021/0287302 A1 | 9/2021 | Mukherjee et al. |
| 2021/0350081 A1 | 11/2021 | De Peuter et al. |
| 2022/0092436 A1 | 3/2022 | Unsal et al. |

FOREIGN PATENT DOCUMENTS

| | | |
|---|---|---|
| WO | 02103555 A1 | 12/2002 |
| WO | 2009061917 A1 | 5/2009 |

OTHER PUBLICATIONS

Drummond et al., "Examining the Impacts of Dialogue Content and System Automation on Affect Models in a Spoken Tutorial Dialogue System," Proceedings of the SIGDAL 2011: the 12th Annual Meeting of the Special Interest Group on Discourse and Dialogue, pp. 312-318, Jun. 2011, copyright 2011 ACM, (Year: 2011).

Glushko, et al. "Document Engineering for e-Business," DocEng '02, Nov. 2002, USA, copyright 2002 ACM, pp. 42-48 (Year: 2002).

Hermens, et al. "A Machine-Learning Apprentice for the Completion of Repetitive Forms," Feb. 1994, IEEE, pp. 28-33 (Year: 1994).

(56) References Cited

OTHER PUBLICATIONS

Middleton et al., "Capturing Knowledge of User Preferences: Ontologies in Recommender Systems," K-CAP '01 pp. 100-107, copyright 2001, ACM (Year: 2001).
Research Gate, "Thread of Question and Answers on generating training set data from ResearchGate," retrieved from https://www.researchgate.net/post/How_can_I_Generate_the_training_data_From_the_dataset_of_images, Questions and answers dated Jul. 2015, pp. 1-5 (Year: 2015).
Wang et al., Action Prediction and Identification From Mining Temporal User Behaviors, WSDM'11, Feb. 9-12, 2011, Hong Kong, China, Copyright 2011 ACM, pp. 435-444 (Year: 2011).
Zhang, "Genetic Programming for Symbolic Regression," 2015, University of Tennessee, Knoxville, TN 37966, USA, 6-pages (Year: 2015).
Chu et al., "Data Cleaning: Overview and Emerging Challenges," Proceedings of the 2016 International Conference on Management of Data, pp. 2201-2206, Jun. 2016.
Frantzi, et al., "Automatic Recognition of Multi-Word Terms: The c-value/nc-value Method," International Journal on Digital Libraries 3.2, pp. 115-130, 2000.
Nakagawa et al., "A Simple but Powerful Automatic Term Extraction Method," COLING-02: COMPUTERM 2002: Second International Workshop on Computational Terminology, 7-pages, 2002.
Anonymous, "Form 2441—Child and Dependent Care Expenses," Retrieved from the Internet on Feb. 12, 2020 <URL: http://taxhow.net/static/form/pdf/federal/1580446800/f2441--2016.pdf>, (Year: 2016).
Borovicka et al., "Selecting Representative Data Sets," Advances in Data Mining Knowledge Discovery and Applications, Chap. 2, pp. 43-70, 2012.
Drechsler et al., "Generating Formal System Models from Natural Language Descriptions," IEEE, pp. 164-165 (Year 2012).
Kordos et al., "Instance Selection with Neural Networks for Regression Problems," Artificial Neural Networks and Machine Learning, ICANN 2012, Lecture Notes in Computer Science, vol. 7553.
Yan et al., Formal Consistency Checking over Specifications in Natural Languages, Design, Automation & Test in Europe Conference & Exhibition (DATE), pp. 1677-1682 (Year: 2015).
Toda et al., "A Probabilistic Approach for Automatically Filling Form-Based Web Interfaces," Proceedings of the VLDB Endowment 4.3 (2010), pp. 151-160, (Year: 2010).

\* cited by examiner

```
                            ┌─ 300
                            ▼

┌─────────────────────────────────────────────────────────┐
│   Capture an image of text in a financial document. (302) │
└─────────────────────────────────────────────────────────┘
                            │
                            ▼
┌─────────────────────────────────────────────────────────┐
│              Identify text in the image. (304)            │
└─────────────────────────────────────────────────────────┘
                            │
                            ▼
┌─────────────────────────────────────────────────────────┐
│  Convert the identified text in the image to computer readable text. (306)  │
└─────────────────────────────────────────────────────────┘
                            │
                            ▼
┌─────────────────────────────────────────────────────────┐
│  Segment the computer readable text into one or more segments. (308)  │
└─────────────────────────────────────────────────────────┘
```

┌─────────────────────────────────────────────────────────┐
│      Tokenize a segment into a plurality of n-grams. (402) │
└─────────────────────────────────────────────────────────┘
                            │
                            ▼
┌─────────────────────────────────────────────────────────┐
│  Lemmatize one or more n-grams of the plurality of n-grams based on a lexicon. (404)  │
└─────────────────────────────────────────────────────────┘
```

FIG. 4

ND TEXT
CONVERSION TO COMPUTER READABLE
OPERATIONS

TECHNICAL FIELD

This disclosure relates generally to text conversion, and specifically to converting natural language text in financial documents to computer readable operations for execution for a financial management program.

DESCRIPTION OF RELATED ART

Financial management programs, such as tax preparation software, require a plurality of financial documents to be reviewed and translated into computer readable code. For example, instructions on how to prepare a 1099 tax document or instructions providing information about each field in a 1040 tax document for United States federal tax preparation may need to be reviewed by a person that manually programs operations related to each document into the program. In this manner, one or more people review each financial document relevant to a financial management program in order to code the program to be current with all such documents. However, a plethora of financial documents may be continuously updated. For example, the United States Internal Revenue Service may update instructions for tax returns every year. Additionally, new documents may be repeatedly added, which require constant reviews in order to update the financial management program.

Accordingly, there is a need for an automated system to review and convert text in financial documents to computer readable operations for a financial management program. Additionally, because of the sheer number of documents that may be released in one or more jurisdictions (such as different countries, states, or provinces for tax purposes), there is a need for the automated system to expeditiously review documents and convert text included in the documents to computer readable operations for the financial management program.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented as a method for converting natural language text in financial documents to mathematical operations for a financial management program. In some implementations, the method can be performed by one or more processors of a computing device, and can include obtaining a first segment of computer readable text associated with a text capture in a financial document, parsing only a portion of the first segment to generate a parsed segment, and determining translation information associated with the parsed segment to translate the parsed segment. The method may also include storing the parsed segment and the translation information in a data structure in memory, translating the parsed segment in the data structure based on the translation information, and outputting one or more computer readable mathematical operations corresponding to the translated segment. In this manner, the computing device may output the one or more computer readable mathematical operations without parsing all of the segment. The method may also include capturing an image of text in the financial document, identifying text in the image, converting the text to computer readable text, and segmenting the computer readable text into one or more segments including the first segment. The method may further include tokenizing the first segment into a plurality of n-grams and lemmatizing one or more n-grams based on a lexicon.

Parsing may include analyzing each of the plurality of n-grams in order in the first segment to identify one or more n-grams associated with one or more operators for executable calculations. Parsing may also include, for each of the one or more identified n-grams, associating one or more n-grams neighboring the identified n-gram with an executable calculation and bracketing the one or more associated n-grams with the identified n-gram. Each executable calculation may include an operator associated with the identified n-gram and one or more variables associated with the one or more neighboring n-grams of the identified n-gram. Parsing may further include, for a bracket of one or more neighboring n-grams and the identified n-gram, identifying a first n-gram of the one or more neighboring n-grams as a first variable of the one or more variables based on a neighboring n-gram of the first n-gram and ordering the one or more neighboring n-grams to associate the first n-gram with the first variable. The data structure preserves the ordering of the one or more neighboring n-grams. Parsing may also include, for the bracket of one or more neighboring n-grams and the identified n-gram, determining that n-grams of the first segment preceding the bracket do not include an n-gram associated with an executable calculation and excluding the n-grams preceding the bracket from further processing. The preceding n-grams are not associated with the one or more computer readable mathematical operations. Translating may include, for the bracket of one or more neighboring n-grams and the identified n-gram, translating the identified n-gram into the associated operator and translating the first n-gram into the first variable.

The method may also include determining whether the translated segment can be converted to the one or more computer readable mathematical operations based on one or more well-formedness rules and the translation information. In response to determining that the translated segment cannot be converted, the computing system may further parse the translated segment and further translate the parsed, translated segment. In response to determining that the translated segment can be converted, the computing system may convert the translated segment into the one or more computer readable mathematical operations for output. The method may further include recursively parsing and translating the first segment and determining whether the recursively parsed and translated segment can be converted to the one or more computer readable mathematical operations based on the one or more well-formedness rules and the translation information after each iteration of parsing and translating. The computing system may then convert the recursively parsed and translated segment to the one or more computer readable mathematical operations in response to determining that the recursively parsed and translated segment can be converted. In this manner, the computing system may convert the segment at a sufficient point of parsing and translation without requiring a complete parsing and translation of the entire segment into computer readable code.

The method may include preventing further parsing and translating of a subset of consecutive n-grams in the first segment based on determining that the subset of consecutive n-grams are not associated with any executable calculation. The method may also include obtaining a second segment of computer readable text associated with the text capture in the financial document, determining that no n-grams of the second segment are associated with any executable calculation, and preventing further processing of the second segment in response to determining that no n-grams of the second segment are associated with any executable calculation. The method may further include executing the outputted one or more computer readable mathematical operations during execution of a financial management program. The financial management program may include a tax preparation application, and the financial document may be a tax form or instructions associated with the tax form.

Another innovative aspect of the subject matter described in this disclosure can be implemented in a system. The system can include at least one or more processors and a memory. The memory may store instructions that, when executed by the one or more processors, causes the system to perform a number of operations. In some implementations, the number of operations includes obtaining a first segment of computer readable text associated with a text capture in a financial document, parsing only a portion of the first segment to generate a parsed segment, determining translation information associated with the parsed segment to translate the parsed segment, storing the parsed segment and the translation information in a data structure in memory, translating the parsed segment in the data structure based on the translation information, and outputting one or more computer readable mathematical operations corresponding to the translated segment. The operations may also include tokenizing the first segment into a plurality of n-grams and lemmatizing one or more n-grams based on a lexicon.

Parsing may include analyzing each of the plurality of n-grams in order in the first segment to identify one or more n-grams associated with one or more operators for executable calculations. Parsing may also include, for each of the one or more identified n-grams, associating one or more n-grams neighboring the identified n-gram with an executable calculation and bracketing the one or more associated n-grams with the identified n-gram. Each executable calculation may include an operator associated with the identified n-gram and one or more variables associated with the one or more neighboring n-grams of the identified n-gram. Parsing may further include, for a bracket of one or more neighboring n-grams and the identified n-gram, identifying a first n-gram of the one or more neighboring n-grams as a first variable of the one or more variables based on a neighboring n-gram of the first n-gram and ordering the one or more neighboring n-grams to associate the first n-gram with the first variable. The data structure preserves the ordering of the one or more neighboring n-grams. Parsing may also include, for the bracket of one or more neighboring n-grams and the identified n-gram, determining that n-grams of the first segment preceding the bracket do not include an n-gram associated with an executable calculation and excluding the n-grams preceding the bracket from further processing. The preceding n-grams are not associated with the one or more computer readable mathematical operations. Translating may include, for the bracket of one or more neighboring n-grams and the identified n-gram, translating the identified n-gram into the associated operator and translating the first n-gram into the first variable.

Execution of the instructions may also cause the system to perform other operations including determining whether the translated segment can be converted to the one or more computer readable mathematical operations based on one or more well-formedness rules and the translation information. In response to determining that the translated segment cannot be converted, the computing system may further parse the translated segment and further translate the parsed, translated segment. In response to determining that the translated segment can be converted, the computing system may convert the translated segment into the one or more computer readable mathematical operations for output.

Another innovative aspect of the subject matter described in this disclosure can be implemented in a non-transitory computer-readable medium. The non-transitory computer-readable medium may store instructions that, when executed by one or more processors of an apparatus, cause the apparatus to convert natural language text in financial documents to mathematical operations for a financial management program by performing a number of operations. In some implementations, the number of operations includes obtaining a first segment of computer readable text associated with a text capture in a financial document, parsing only a portion of the first segment to generate a parsed segment, determining translation information associated with the parsed segment to translate the parsed segment, storing the parsed segment and the translation information in a data structure in memory, translating the parsed segment in the data structure based on the translation information, and outputting one or more computer readable mathematical operations corresponding to the translated segment. The operations may also include tokenizing the first segment into a plurality of n-grams and lemmatizing one or more n-grams based on a lexicon.

Parsing may include analyzing each of the plurality of n-grams in order in the first segment to identify one or more n-grams associated with one or more operators for executable calculations. Parsing may also include, for each of the one or more identified n-grams, associating one or more n-grams neighboring the identified n-gram with an executable calculation and bracketing the one or more associated n-grams with the identified n-gram. Each executable calculation may include an operator associated with the identified n-gram and one or more variables associated with the one or more neighboring n-grams of the identified n-gram. Parsing may further include, for a bracket of one or more neighboring n-grams and the identified n-gram, identifying a first n-gram of the one or more neighboring n-grams as a first variable of the one or more variables based on a neighboring n-gram of the first n-gram and ordering the one or more neighboring n-grams to associate the first n-gram with the first variable. The data structure preserves the ordering of the one or more neighboring n-grams. Parsing may also include, for the bracket of one or more neighboring n-grams and the identified n-gram, determining that n-grams of the first segment preceding the bracket do not include an n-gram associated with an executable calculation and excluding the n-grams preceding the bracket from further processing. The preceding n-grams are not associated with the one or more computer readable mathematical operations. Translating may include, for the bracket of one or more neighboring n-grams and the identified n-gram, translating the identified n-gram into the associated operator and translating the first n-gram into the first variable.

The operations may also include determining whether the translated segment can be converted to the one or more computer readable mathematical operations based on one or more well-formedness rules and the translation information. In response to determining that the translated segment cannot be converted, the computing system may further parse the translated segment and further translate the parsed, translated segment. In response to determining that the translated segment can be converted, the computing system may convert the translated segment into the one or more computer readable mathematical operations for output.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

The example implementations are illustrated by way of example and are not intended to be limited by the figures of the accompanying drawings. Like numbers reference like elements throughout the drawings and specification.

FIG. 3 shows an illustrative flow chart depicting an example operation for converting text in a financial document to one or more segments of computer readable text for processing by a computing system.

FIG. 4 shows an illustrative flow chart depicting an example operation for processing a segment into a tokenized, lemmatized segment for further processing.

DETAILED DESCRIPTION

Implementations of the subject matter described in this disclosure may be used to convert text in a natural language form within a financial document into one or more computer readable mathematical operations for a financial management program. For example, all of the text from a plurality of tax documents or other financial documents need to be reviewed in order to code or provide inputs to a tax preparation program for preparing tax returns. Additionally, financial documents continuously change and more documents are added as taxation laws or guidance changes over time. To further complicate the matter, different portions of the text in the documents are written by different people with different writing styles. For example, active or passive voice may be used, commands or a narrative may be used, third person or first person voice may be used, different ordering of phrases may be used, and so on. In this manner, multiple sentences having the same meaning may be written in a completely different way so as not to resemble one another in terms of the sentence construct. Therefore, a robust, automated system for converting text in financial documents to computer readable mathematical operations is needed.

Various implementations of the subject matter disclosed herein provide one or more technical solutions to the technical problem of converting text in financial documents to computer readable mathematical operations. More specifically, various aspects of the present disclosure provide a unique computing solution to a unique computing problem that did not exist prior to financial management programs, such as tax preparation software to facilitate automated preparation of tax return documents. As such, implementations of the subject matter disclosed herein are not an abstract idea such as organizing human activity or a mental process that can be performed in the human mind.

Figure 1:
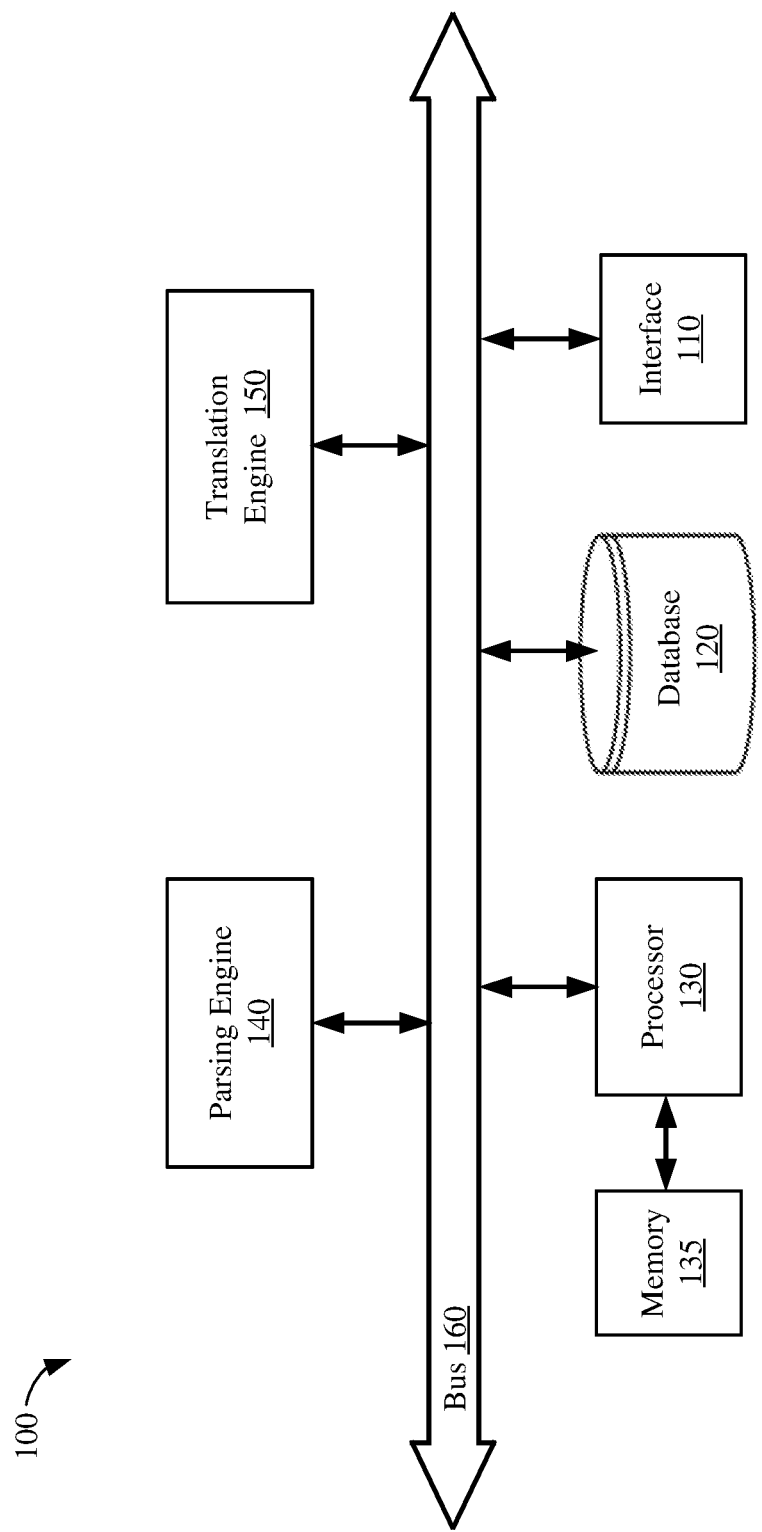
FIG. 1 shows an example computing system to convert text in a financial document to computer readable mathematical operations for a financial management program.

FIG. 1 shows an example computing system 100 configured to convert text in financial documents to computer readable mathematical operations for a financial management program. The system 100 is shown to include an interface 110, a database 120, one or more data processors 130, a memory 135 coupled to the data processors 130, a parsing engine 140, and a translation engine 150. In some implementations, the various components of the system 100 may be interconnected by at least a data bus 170, as depicted in the example of FIG. 1. In other implementations, the various components of the system 100 may be interconnected using other suitable signal routing resources.

The interface 110 may include one or more output devices, input devices, or other suitable elements that allow financial documents or text to be ingested by the system 100 or to output information from the system 100. In some implementations, electronic financial documents (such as a pdf document, an xml document, a tiff document, a jpeg image of a document, and so on) may be provided to the computing system 100 via the interface 110 (such as a serial interface or a parallel interface external to the computing system 100). In some other implementations, the text from financial documents may be provided to the computing system 100 via the interface 110. The text may include computer formatted text (such as after object character recognition), image captures of text, or another suitable format for text. The examples herein are described with reference to pdf documents received by the computing system 100, but the examples herein apply to other data types received at the interface 110.

In some implementations, a system for converting text in financial documents to computer-readable mathematical operations may be rule-based. In this manner, pre-defined rules are used to automatically convert the text. The database 120 may store the plurality of rules used for converting text in financial documents. The rules include relationship rules for parsing text. Relationship rules may include rules mapping prepositions, appositions, or other text modifiers to transforms for the base noun of the modifier. Relationship rules may also include rules mapping relationships between phrases or segments. For example, if text is divided into sentence size segments, and the text "If yes, enter line 23. Otherwise, enter line 24." Is to be processed. The relationship rules may include one or more rules to determine that "Otherwise" in the text (such as based on punctuation, capitalization, and the meaning of 'otherwise') causes the second sentence to be dependent on the first sentence for an "if, else" mathematical operation. As noted, relationship rules may also include punctuation rules (such as regarding commas, periods, and so on) and character formatting rules (such as capitalization) defining segmentation of phrases, sentences, or other units of text as well as defining relationships between phrases, terms, or segments. The punctuation and character formatting rules may also be used to indicate formal nouns and other special terms in a segment. Relationship rules may include other grammar rules, such as for conjunctions, verb tense, and so on, that are used to define relationships between neighboring terms in a text segment (or between segments). Relationship rules may also include rules defining specific terms modifying or having a relationship with one or more neighboring terms (such as line, box, or form having a relationship with a subsequent term defining which line, box or form). Such relationship rules may be defined in a grammar look up table or other structure (referred to herein as a grammar dictionary) in the database 120. The grammar dictionary may be updated as needed to account for changes in use of language (such as stylistic changes) in financial documents.

The database 120 may also store one or more lexica. A lexicon may associate similar terms with one another (such as synonyms), associates different tenses or versions of a term with the root term, associates specific verbs or nouns with executable calculations (such as add, subtract, remove, difference, summation, minimum, and so on), and associate nouns with variables for an executable calculation (such as "line" occurring after the verb "subtract"). In this manner, a lexicon may be used for lemmatization of terms, associating terms with one another with reference to an executable calculation, or to determine ordering of terms for an executable calculation. A lexicon may also be updated as needed to account for changes in terms or use of terms in financial documents. In some implementations, the database 120 stores a lexicon for unigrams and a lexicon for n-grams. In this manner, a first set of rules may be associated with a specific word in the unigram lexicon, and a second set of rules may be associated with a specific phrase (including multiple words) in the n-gram lexicon. As a result, a word in the unigram lexicon that is within a phrase in the n-gram lexicon may cause the system 100 to perform the first set of rules and the second set of rules.

The database 120 may further store well-formedness rules for determining when text has been sufficiently processed to convert and output as computer readable mathematical operations. In some implementations, the well-formedness rules may indicate relationships of terms with reference to an executable calculation for the system 100 to determine whether all variables are identified for the executable calculation in order to convert to a mathematical operation. Other constraints may also be defined in the well-formedness rules to allow text to be converted to computer readable mathematical operations without requiring complete parsing of the text.

The database 120 may also store the computer readable mathematical operations generated using the described methods. In this manner, the system 100 may later execute the mathematical operations during execution of a financial management program. The database 120 may further store executable instructions for the computing system 100 to convert text to computer readable mathematical operations.

The data processors 130, which may be used for general data processing operations (such as manipulating the rules stored in the database 120, executing the instructions stored in the database 120, and so on), may be one or more suitable processors capable of executing scripts or instructions of one or more software programs stored in the system 100 (such as within the memory 135 or the database 120). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other configuration).

The memory 135 may be any suitable memory to store any number of software programs, executable instructions, machine code, algorithms, and the like that can be executed by the data processors 130 to perform one or more corresponding operations or functions. For example, the memory 135 may store one or more data structures to persist parsing and translation of text when processing to generate the mathematical operations. In some examples, the memory may be a persistent memory (such as non-volatile memory).

In some implementations, hardwired circuitry may be used in place of, or in combination with, software instructions to implement aspects of the disclosure. As such, implementations of the subject matter disclosed herein are not limited to any specific combination of hardware circuitry and/or software.

The parsing engine 140 may be used to parse text from financial documents. In some implementation, the parsing engine 140 segments text into one or more segments. For example, the parsing engine 140 identifies punctuation in the text and divides the text into sentence size segments based on the punctuation. In some further implementations, the parsing engine 140 may tokenize text in a segment. For example, the parsing engine 140 converts the text in a segment to one or more n-grams. In some aspects, the parsing engine 140 converts the segment's text into unigrams (with each term or word in the segment being converted to a unigram). In some aspects, the parsing engine 140 may use a lexicon to replace a unigram with a synonym. For example, the parsing engine 140 may identify a unigram "reduce" in a segment as a synonym for "subtract," and "subtract" may be a key term in a unigram lexicon (such as a term associated with an operation to be performed). The parsing engine 140 replaces the term "reduce" with "subtract." In some other aspects, the parsing engine 140 may use the lexicon to determine a root word for a term. For example, the parsing engine 140 may lemmatize one or more unigrams or stem one or more unigrams in the segment. In a specific example, the parsing engine 140 may identify that a unigram "subtracting" in a segment has a root word of "subtract." The parsing engine 140 may replace the unigram "subtracting" with "subtract" during lemmatization. In this manner, the parsing engine 140 may process the segment to include unigrams of terms in their root form (which may be a word for lemmatization or not a word for stemming). In combining the two examples, the parsing engine 140 may convert "reducing" to "reduce" (root form) to "subtract" (synonym). In this manner, "reducing" may be associated with a subtraction operation to be coded in a computer readable mathematical operation.

In some implementations, the parsing engine 140 may use an n-gram lexicon (where n is greater than one) to identify an n-gram in addition to using a unigram lexicon to identify a unigram. In this manner, if text is segmented into unigrams, consecutive unigrams may be analyzed together using the n-gram lexicon (such as to find a match associated with an executable calculation). For example, a specific term within a phrase may be lemmatized based on the unigram lexicon, and the phrase (with the lemmatized term) may be associated with a specific executable calculation based on the n-gram lexicon. As used herein, though, parsing or analyzing using an n-gram lexicon may refer to one or more of a unigram lexicon or an n-gram lexicon where n is greater than one. In addition, an n-gram may refer to when n equals one (unigram) or is greater than one unless stated otherwise. For example, analyzing an n-gram may refer to analyzing a unigram, analyzing a plurality of unigrams, or a combination of both.

The parsing engine 140 may use one or more relationship rules to determine one or more executable calculations existing in a text segment (such as identifying the term "subtract" in the segment or a phrase including the term "subtract"), associate terms in the segment with an executable calculation (identify that a "sub(variable1, variable2)" operation is to be coded), and determine translation information regarding relationships between the associated terms for the executable calculation (such as associating terms with variables or an operator of the executable calculation). The one or more relationship rules may also be used to determine a relationship between segments, such as determining that an executable calculation expands across multiple segments.

As used herein, an executable calculation may be one or more calculations or operations to be embodied in computer readable form for execution by one or more processors during execution of a financial management program. Example executable calculations may include arithmetic operations (such as addition, subtraction, division, multiplication, increment, decrement, and so on), analytical or statistical operations (such as limit, minimum, maximum, median, mean, standard deviation, variance, and so on), associative operations (such as enter, replace, switch, and so on), and conditional operations (such as when, if/else, and so on).

The parsing engine 140 may also bracket n-grams together to identify associations between terms. For example, the parsing engine 140 may identify a comma in a sentence segment, and the parsing engine may bracket together the unigrams after the comma to indicate an association between the unigrams apart from the remainder of the segment. In another example, the parsing engine 140 may identify a sequence of unigrams in the segment existing in an n-gram lexicon, and the parsing engine may bracket together the unigrams to indicate an association based on the n-gram lexicon. As used herein, bracketing is indicating an association between n-grams in any suitable manner. For example, the segment may be stored in a data structure of computer readable text, and the parsing engine 140 may enter a parenthesis, bracket, or so on that is understood by the computing system 100 to group a plurality of n-grams as associated with one another. In another example, a data structure may include a field for each n-gram. The data structure may also include control information. The control information may be updated to indicate an association between n-grams during bracketing. Parenthesis or other characters entered or control information of the data structure may be included in translation information of a data structure for translating the segment.

The parsing engine 140 may also reorder n-grams (such as to change tense or syntax to a common tense or syntax). For example, for a segment stored in a data structure including fields of n-grams, the fields may be rearranged or the control information may be updated to indicate a new sequence of the fields for the segment. In another example, a data structure may have the n-grams rearranged by character reordering in the segment to indicate the new ordering of n-grams.

The parsing engine 140 may further perform frame binding. Frame binding herein refers to using defined relationships between n-grams to determine how to bracket and construct (such as reorder) the segment for translation. Frame binding may also refer to using defined relationships to determine and indicate relationships between frames or segment portions. Frame binding may include rules regarding distance of nouns from verbs, ordering of terms, sentence hierarchy (such as if part of a prepositional phrase), modifiers of apposition terms, punctuation and character formatting, and so on to bracket terms together or otherwise structure the segment or bind multiple frames. For example, for the segment phrase "reduce line 24 by line 23," the parsing engine 140 may determine "reduce" is a verb associated with executable calculation sub( ). The parsing engine 140 may therefore determine that at least two nouns subsequent to "reduce" are associated with the executable calculation (since sub( ) includes at least two variables). The parsing engine 140 may thus determine that "line 24" and "line 23" are two nouns closest and subsequent to the verb and are thus associated with the executable calculation. The parsing engine 140 may also use rules regarding prepositions to determine which is a first variable and which is a second variable of the executable calculation. For example, the parsing engine 140 uses a rule regarding "by" associated with the executable calculation for subtraction to determine that line 24 is the first variable and line 23 is the second variable (with sub(variable1,variable2)=variable 1−variable 2). In this manner, the parsing engine 140 identifies a relationship between the n-grams, and may bracket the neighboring n-grams to be associated with "reduce." In the above example, the parsing engine 140 may parse "reduce line 24 by line 23" as "(reduce(line 24, by line 23))." If the parsing engine 140 does not fully parse the text portion associated with the executable calculation during a pass through the segment, the parsing engine 140 may include any remaining associated n-grams in a third field (such as after ", by line 23" in the above parsing example). In this manner, the parsing engine 140 is not required to completely parse a segment before attempting to translate the segment.

The data structure storing a segment may be stored in any suitable memory (such as memory 135 or database 120). In this manner, the parsing engine 140 may access the memory to access the data structure and store any changes to the segment in the data structure. Any suitable data structure may be used to indicate the segment, changes to the segment (such as reordering, lemmatization, and so on) and any determined relationships between n-grams in the segment (such as bracketing, identifying executable calculations, and so on). Translation information used by the translation engine 150 to translate the segment may include the determined relationship information (such as between n-grams in a segment or across segments).

The translation engine 150 may be used to translate the parsed segment into one or more well-formed formal expressions (such as based on well-formedness rules) that are coded into one or more computer-readable mathematical operations. The computer-readable mathematical operations are formatted in a formal computer language with a defined structure and syntax. The computer language is defined with one or more lexicon and grammar (similar to a natural, spoken language, such as English). In some implementations, the translation engine 150 generates the formal expressions in a pseudo-first-order predicate logic format (which may be referred to as predicate argument structures (PAS)) defined by the computer language. In using PAS format for the computer language, the computing system 100 may identify relationships between neighboring segments or phrases, determine a hierarchy of the mathematical operations to be perform, and bracket and order the n-grams to indicate such hierarchy during parsing. The rules that are met for parsing may indicate relationships between brackets of n-grams or other translation information stored in the data structure including the parsed segment, and the translation engine 150 uses the translation information, translation rules, and well-formedness rules to generate the mathematical operations in the PAS format.

Referring back to the example of the parsed phrase "(reduce(line 24, by line 23))," the parsing engine 140 may replace "reduce" with the "sub( )" operator to generate "(sub(line 24, by line 23))." Such phrase may be stored in the data structure for the segment, and the translation engine 150 access the data structure and translates the phrase. Relationship rules may indicate that the unigram "line" is associated with the subsequent number, and the translation engine may therefore update the phrase "(sub(line 24, by line 23))" to "(sub(line(24), by line(23)))," wherein "line( )" is a keyword in the computer language (such as for a memory location or specific variable in the financial management program). The relationship rules may also indicate that the unigram "by" is extraneous, and the translation engine 150 removes the unigram to generate "(sub(line(24), line(23)))." The translated phrase may meet well-formedness rules for the subtraction operation. If no other n-grams in the segment are ambiguous regarding well-formedness rules (such as another bracket of n-grams not conforming for an executable calculation, the translation engine 150 may generate the computer readable mathematical operation "sub (line(24), line(23))" (stripping the outside brackets as extraneous). Additional details regarding translation and generating the mathematical operations are provided herein, and translation should not be limited to the above examples.

The particular architecture of the computing system 100 shown in FIG. 1 is but one example of a variety of different architectures within which aspects of the present disclosure may be implemented. For example, in other implementations, the system 100 may not include a parsing engine 140, the functions of which may be implemented by the processors 130 executing corresponding instructions or scripts stored in the memory 135. Similarly, the functions of the translation engine 150 may be performed by the processors 130 executing corresponding instructions or scripts stored in the memory 135. Thus, while the examples herein are described with reference to the computing system 100, any suitable architecture may be used to perform the described methods.

As noted, an automated system to ingest and process financial document text is needed for financial management programs. As a result, robust natural language processing is required for converting natural language text to computer readable mathematical operations in the defined computer language. Typical computer languages for conversion from a natural language require explicit ordering of commands to be executed. Additionally, typical computer languages do not define relationship information between commands, other than the order they appear or through use of a common variable. As noted above, the computer language for use by the computing system 100 may include structuring of mathematical operations to indicate relationships between different portions of an operation or between operations. Since the computing system 100 is configured to identify and indicate relationships, the computing system 100 is not required to fully parse a segment before attempting to translate. For example, the segment does not require meeting well-formedness rules before parsing ends and translation may be attempted.

Other attempts to parse and translate include first parsing and then translating only one time to generate an output. As a result, other attempts require a segment to be fully parsed before it can be translated. However, in implementations of the present disclosure, if a segment does not sufficiently meet the well-formedness rules after attempting to translate (for which the translated segment may be referred to as "not well-formed"), the computing system 100 may again perform parsing and translation. Any number of parsing and translation iterations may be performed until the segment is well-formed. In this manner, the computing system 100 may recursively parse and translate and not require a full parsing of the segment at one time.

Segment (1) below is an example segment of text for converting to one or more mathematical operations:

$$\text{Otherwise,subtract line 24 from the smaller of line 20 or line 21} \tag{1}$$

Two mathematical operations are expressed in the segment: subtraction and a minimum ("smaller of"). Typical attempts would require a full parsing before translation. As a result, if the segment is parsed from left to right, the subtract operator may be identified first, and the attempt to parse may require the first two "lines" that appear from left to right to be the variables of the subtract operator (such as "sub(line(24), line(20))"). Further parsing would then reach the "smaller of" terms to indicate a minimum function, and the attempt to parse may require the first two "lines" that appear from left to right to be the variable of the minim operator (such as "min(line(20), line (21))"). In this manner, the attempt to parse may generate (after translation) the operations 1: sub(line(24), line(20)) and 2: min(line(20), line (21)), which are incorrect and do not account for hierarchy of the executable calculations in the segment.

Furthermore, requiring full parsing of an entire segment (including attempting to place every n-gram in such a manner to meet well-formedness rules) may not be required but is performed by previous attempts (such as parsing a string of n-grams in the segment having no effect on the one or more mathematical operations to be generated). Segment (2) below is an example segment of text for converting to one or more mathematical operations:

$$\text{Enter the result as a decimal(rounded to at least three places).} \tag{2}$$

The mathematical operation intended to be generated is "round(var, 3)," where "var" is the result from a previous calculation. As shown, enter the result as a decimal has little effect on the mathematical operation "round". However, previous attempts to parse would begin parsing the terms "Enter the result" and "as a decimal" before reaching "rounded to at least three places." As a result, processing resources and time may be consumed unnecessarily parsing text.

Implementations herein partially parse a segment during a first pass to attempt to reduce the amount of time and processing resources required to convert a segment to one or more mathematical operations and to correctly indicate relationships between mathematical operations for correct conversion of the segment to one or more mathematical operations.

Figure 2:
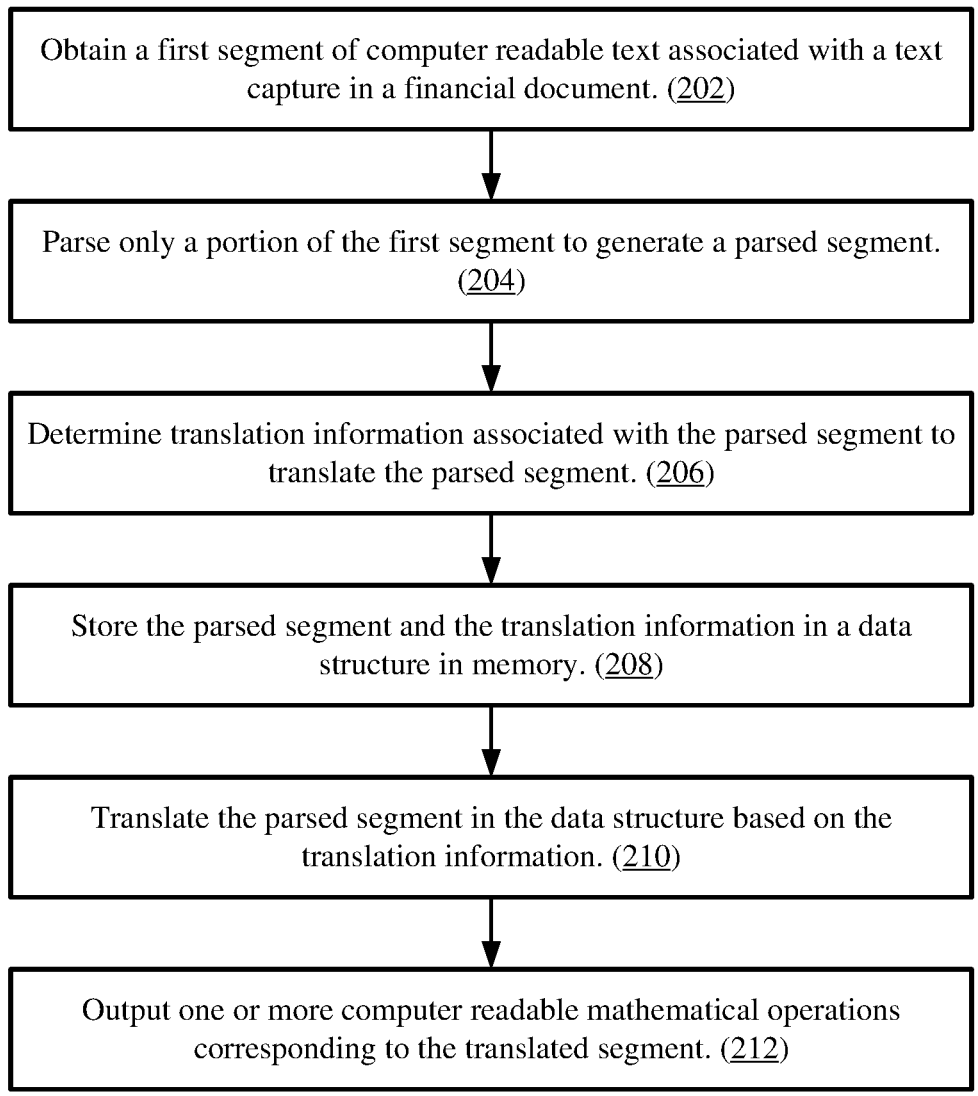
FIG. 2 shows an illustrative flow chart depicting an example operation for converting financial document text to one or more computer readable mathematical operations.

FIG. 2 shows an illustrative flow chart depicting an example operation 200 for converting financial document text to one or more computer readable mathematical operations. The example operation 200 is described below with respect to the computing system 100 of FIG. 1 for illustrative purposes only. It is to be understood that the example operation 100 may be performed by other suitable systems, computers, or servers.

At 202, the computing system 100 obtains a first segment of computer readable text associated with a text capture in a financial document. In some implementations, a separate computing system ingests financial documents (such as receiving image captures of paper documents, receiving pdfs, and so on), and text in the documents are identified and converted to one or more segments of computer readable text to be provided to the computing system 100 for parsing and translation. The interface 110 receives the segments to begin parsing and translation of the text in the segments.

In some other implementations, the computing system 100 performs the ingestion of financial documents and generation of one or more segments of computer readable text from the documents. FIG. 3 shows an illustrative flow chart depicting an example operation 300 for converting text in a financial document to one or more segments of computer readable text for processing by a computing system. The example operation 300 may be included in some implementations of step 202 in FIG. 2. Beginning at step 302, the computing system 100 captures an image of text in a financial document. For example, the interface 110 may receive one or more financial documents in an electronic format (such as in a pdf or tiff format). The computing system 100 may scan an obtained financial document to determine locations of text in the document. The system 100 then captures an image of at least a portion of the financial document including the one or more locations with text.

Proceeding to 304, the system 100 identifies text in the image. Identifying the text may include identifying a text language and a length or amount of text. The computing system 100 also converts the identified text in the image to computer readable text (306). In some implementations, the computing system 100 performs object character recognition (OCR) to identify text and generate computer readable text for the image.

The computing system 100 then segments the computer readable text into one or more text segments (308). During OCR, the system 100 identifies punctuation, capitalization, and other formatting of the text. The computer readable text thus includes text with punctuation and formatting as the text in the financial document. In some implementations, segments are in units of a sentence (with each sentence being a separate segment). While the examples describe the segments in units of a sentence, any suitable unit may be used (such as multiple sentences being a segment, a paragraph being a segment, a sentence portion being a segment, and so on). To divide the text into one or more segments, the system 100 uses the punctuation and formatting in the computer readable text to identify separate sentences in the text. The system 100 may then divide the compute readable text into the sentence length segments. The system 100 may store each sentence length segment in a separate data structure stored in the computing system 100 (such as in memory 135 or database 120), and each segment (stored in a data structure) is ready for parsing.

Referring back to FIG. 2, after the computing system 100 obtains the first segment, the system 100 (such as the parsing engine 140) parses only a portion of the first segment to generate a parsed segment (204). Parsing only a portion of a segment refers to only partially parsing a segment (i.e., not fully parsing the segment). In some implementations, the first steps of parsing or before parsing includes tokenizing and lemmatizing the segment. FIG. 4 shows an illustrative flow chart depicting an example operation 400 for processing a segment into a tokenized, lemmatized segment for further processing. At 402, the computing system 100 tokenizes a segment into a plurality of n-grams. In some implementations, the parsing engine 140 generates unigrams, with each term in the text segment being converted to a unigram. The parsing engine 140 may order the n-grams the same as the order of terms in the segment in the data structure, or the parsing engine 140 may otherwise indicate the order of the n-grams in the data structure.

For example, for segment (3) below, the parsing engine 140 tokenizes the segment into unigrams for which the items for the grams are words. In some other implementations, suitable items to measure the n-grams may be syllables, phonemes, and so on, and n may be any suitable size (which may be other than one). The curly braces in (4) indicate each n-gram after tokenizing the segment. While punctuation is shown as a separate n-gram, punctuation may be included with a word for an n-gram.

$$\text{Otherwise,subtract line 24 from the smaller of line 20 or line 21.} \tag{3}$$

$$\{\text{Otherwise}\}\{,\}\{\text{subtract}\}\{\text{line}\}\{24\}\{\text{from}\}\{\text{the}\}\{\text{smaller}\}\{\text{of}\}\{\text{line}\}\{20\}\{\text{or}\}\{\text{line}\}\{21\}\{.\} \tag{4}$$

In some other implementations, phrases of multiple words may be tokenized into an n-gram (such as tokenizing "from the" into one n-gram). Referring back to FIG. 4, the parsing engine 140 lemmatizes one or more n-grams of the plurality of n-grams based on a lexicon (404). In some other implementations, the system 100 may perform stemming or otherwise convert words into their root form. As an example of lemmatization, a unigram "reducing" may be lemmatized to "reduce," a unigram "subtracted" may be lemmatized to "subtract," and so on. In another example, lemmatization may remove character formatting (with the formatting saved as translation information in the data structure). For example, "Otherwise" may be replaced with "otherwise." In some further examples, an n-gram lexicon (where n is greater than one) may be used in addition to a unigram lexicon to replace sequences of unigrams or to otherwise process a sequence of unigrams.

Referring back FIG. 2, the parsing engine 140 may perform additional operations to partially parse the tokenized, lemmatized segment. In some implementations, the parsing engine 140 brackets or otherwise associates n-grams together. The parsing engine 140 may also generate a hierarchy of bracketed n-grams, replace one or more n-grams with operators for executable calculations, and order n-grams in the segment for translation. In some implementations, parsing is an operation of processing n-grams in a sequential manner (such as from left to right in the sentence). In some implementations, the parsing engine 140 brackets the n-grams for a segment. Brackets are illustrated as parenthesis in the example herein.

Figure 5:
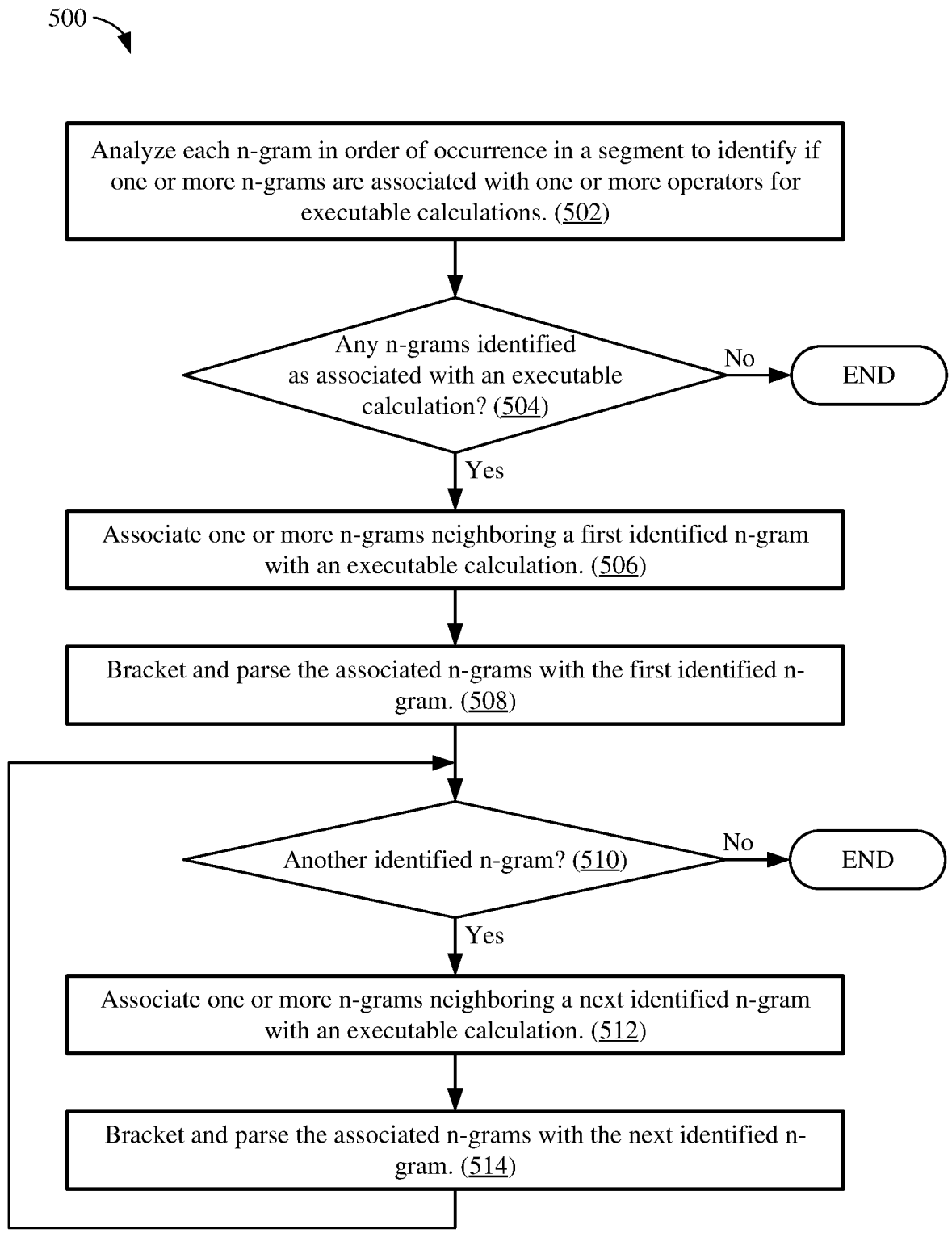
FIG. 5 shows an illustrative flow chart depicting an example operation for parsing a tokenized segment.

FIG. 5 shows an illustrative flow chart depicting an example operation 500 for parsing a tokenized segment. At 502, the parsing engine 140 analyzes each n-gram in order of occurrence in the segment to identify if one or more n-grams are associated with one or more operators for executable calculations. For example, referring to segment (3) after tokenizing (shown in segment (4)), the parsing engine 140 may first bracket the segment (replacing the end punctuation of the sentence) as illustrated in segment (5) below.

$$(\text{Otherwise,subtract line 24 from the smaller of line 20 or line 21}) \tag{5}$$

At decision 504, if no n-grams are identified as associated with an executable calculation, further processing is stopped, and the computing system 100 may determine that the segment is not required for generating all of the compute readable mathematical operations for the financial document. If any n-gram is associated with an executable calculation, the operation 500 proceeds to 506. At 506, the parsing engine 140 associates one or more n-grams neighboring a first identified n-gram with an executable calculation (506).

Continuing the example of segment (5) tokenized into unigrams, the parsing engine 140 analyzes the first unigram "Otherwise" in segment (5). For example, the parsing engine 140 looks up the term "Otherwise" in a lexicon (such as a unigram lexicon which includes various rules for different terms that may appear in text). The lexicon indicates a rule that "Otherwise" is associated with an if/else executable calculation. Rules regarding the if/else operation indicate that since "otherwise" appears at the beginning of the segment, the if portion of the operation appears in a preceding segment (with the n-grams in the preceding segment associated with the if portion). The computing system 100 thus associated the unigrams subsequent to "Otherwise" in the segment with the else portion of the operation.

At 508, the parsing engine 140 brackets and parses the associated n-grams with the first identified n-gram. Continuing the example regarding "Otherwise" in segment (5) above, the parsing engine 140 brackets the unigrams after the comma to the end of the segment, as shown in segment (5A).

(Otherwise(subtract line 24 from the smaller of line 20 or line 21))    (5A)

In some implementations, less than the entire segment may be associated with "Otherwise." For example, based on punctuation and conjunctions (such as the phrase ", and" or ";"), the parsing engine 140 may determine the subset of neighboring n-grams to the identified n-gram to be associated with the executable calculation. With the n-grams bracketed for "Otherwise," the parsing engine 140 processes the bracketed n-grams.

At decision 510, if another n-gram is not identified as associated with an executable calculation, parsing may end, and the segment may be provided to the translation engine 150 (via the data structure) for translation. If another n-gram is identified, the parsing engine 140 may associate one or more n-grams neighboring the next identified n-gram with the executable calculation (512). Proceeding to the next n-gram in the example of segment (5), the parsing engine 140 identifies the next unigram "subtract" as associated with the operation "sub(variable1, variable2)". The parsing engine 140 thus associates a plurality of unigrams subsequent to "subtract" as including the two variables for the operation. Which n-grams to associate may be based on distance from the identified n-gram, punctuation, well-formedness of phrases before further translation, type of operation to be performed, number of variables for the operation, and so on.

At 514, the parsing engine brackets and parses the associated n-grams with the next identified n-gram. Referring back to the identified unigram "subtract" in segment (5), the parsing engine 140 may begin bracketing of the neighboring unigrams, as depicted in segment (6) below.

(Otherwise(subtract(    (6)

The parsing engine 140 analyzes the next unigram "line," and based on rules for "line" in the lexicon, "line" is associated with the next subsequent unigram to indicate which line ("line 24"). In this manner, "line" (or similar terms, such as "box") may be bracketed with the subsequent unigram. Additionally, the rules for "line" indicate that "line" and the next unigram are a variable for an executable calculation. The rules for subtract indicate that the next noun/variable subsequent to the identified n-gram "subtract" is "variable2" for the operation. As such, parsing of segment (5) continues from segment (6), as shown in segment (7) below:

(Otherwise(subtract([no_subject],(line 24)    (7)

[no-subject] indicates that no unigrams are yet identified as the first variable "variable" for the sub operation. As shown, (line 24) is identified as the second variable "variable2" for the sub operation. Referring back to segment (5), there still exists the remainder of the segment "from the smaller of line 20 or line 21." The parsing engine 140 associates the remaining unigrams with the sub operation. To bracket with the sub operation, the parsing engine 140 may place the remainder in a third field of the operation for further processing, as shown in segment (8) below.

(Otherwise(subtract([no_subject],(line 24),from the smaller of line 20 or line 21)    (8)

Proceeding to the next unigram "from," the rules for the sub operation indicates that "from" is a preposition indicating that one or more subsequent n-grams are associated with "variable1." The next unigram "the" is identified as an article in the lexicon as not required, and the parsing engine 140 may remove the unigram from the segment. Proceeding to "smaller," the lexicon indicates that the unigram is to be associated with an executable calculation if followed by specific preposition unigrams (such as "of", "between", "among", and so on). The parsing engine 140, identifying the next unigram to be the preposition "of" associates "smaller of" with a minimum operation. In some further implementations, smaller is always associated with a minimum operation, and the subsequent preposition is removed from the segment as unnecessary or bracketed with the subsequent neighboring n-grams associated with the operation. In some implementations, an n-gram lexicon may be used to find bigrams or larger n-grams in the segment for bracketing purposes. For example, "smaller of line 20 or line 21" may match an entry in the n-gram lexicon associated with a "minimum" executable calculation between a first variable equal to line(20) and second variable equal to line(21).

Referring back to FIG. 5, the computing system recursively performs steps 512 and 514 for the identified n-grams (with flow after 514 reverting to decision 510). With reference to "smaller of", the parsing engine 140 associates one or more neighboring unigrams subsequent to "smaller of" with the executable calculation, brackets the unigrams, and processes the unigrams. However, since the identified operation is within the brackets for the sub operation, the parsing engine 140 may not fully parse the segment remainder. As such, the n-grams are not completely parsed. Reaching the end of the segment, the parsing engine 140 closes the remaining open brackets. Parsing of the segment is shown in segment (9) below.

(Otherwise(subtract([no_subject],(line 24),(from smaller(of line 20 or line 21)))))    (9)

Segment (9) is only partially parsed. For example, if fully parsed, line 24 may be parsed as line(24) which may be the format of the computer language. In other examples, variable1 of the sub operation is not filled, "subtract" is not replaced with the "sub" operator, "smaller" is not replaced with the "min" operator, the bracketed n-grams associated with the minimum operation are not parsed, and there still exists a third field for the subtract operation. Having the parsing engine 140 pass once (from left to right) through the segment, the system 100 may attempt to translate the parsed segment without further parsing. If the segment is able to be translated, further parsing is not required.

Referring back to FIG. 2, the system 100 may determine translation information associated with the parsed segment to translate the parsed segment (206). For example, the associations between n-grams and operators or variables may be included in the data structure to assist the translation engine 150 to translate the parsed segment. Translation information may also include the bracketing, ordering of n-grams (such as placing n-grams in a third field for a sub operation), and so on. Referring back to segment (9), translation information may include indicating variable2 for the sub operation is satisfied, thus leaving only variable1 to be determined.

At 208, the system 100 stores the parsed segment and the translation information in a data structure in memory. As noted herein, the data structure may be any suitable data structure stored in any suitable memory (such as memory 135 or database 120). Proceeding to 210, the system 100 (such as the translation engine 150) translates the parsed segment in the data structure based on the translation information. For example, the brackets, ordering of n-grams, information regarding variables and operators for executable calculations are used to translate the parsed segment in the data structure.

During translation, the translation engine 150 determines if any conditions for translation rules are met. Translation rules may be specific to specific tokes, bracketed n-grams, or even pattern driven based on positioning of specific terms or phrases. For example, referring to segment (9) above, as the translation engine 150 moves from left to right through the segment, "smaller(of line 20 or line 21)" may match a translation master rule for a minimum operation, and the master rule may include associated rules for translating the segment portion to a well-formed operation (such as line 20 to line(20) and line 21 to line(21), and identifying line(20) and line(21) as variables for the minimum operations).

For example, the minimum operation may include at least two variables. In this manner, the next unigram "line" is translated with the subsequent unigram to "line(20)" and identified as one variable of the minimum operation. The next unigram "or" is identified as a conjunction, and the translation rules for the minimum operation indicate that the subsequent line an unigram indicate a second variable for the minimum operation ("line(21)"). As such, the translation engine 150 translates "smaller(of line 20 or line 21)" to "min(line(20), line(21))". In the data structure, "min(line (20), line(21))" is associated with the unigram "from" in segment (9), which for the parsing rules associated with the subtract operation indicates variable1. Translation of the segment (9) is shown in segment (10) below (with "min (line(20), line(21))" indicated to be associated with the removed from or associated with variable1 for operation sub). As shown, "Otherwise" is converted to "otherwise" (removing capitalization, which may occur during parsing or during translation).

(otherwise(subtract([no_subject],(line 24),min(line (20),line(21)))))      (10)

In some implementations, if the segment conforms to well-formedness rules, the segment is converted to one or more mathematical operations, and the one or more mathematical operations are output for execution during execution of the financial management program. Well-formedness rules may refer to the rules used to convert the segment to one or more mathematical operations. If the rules are unable to be used to convert the segment in its current form, the segment may be considered not to be well-formed. If the rules are able to be used to convert the segment, the segment may be considered well-formed. For example, segment (10) may not be well-formed because the well-formedness rules cannot be used to decipher the sub operation with variable1 that is empty and a third field that exists.

Figure 6:
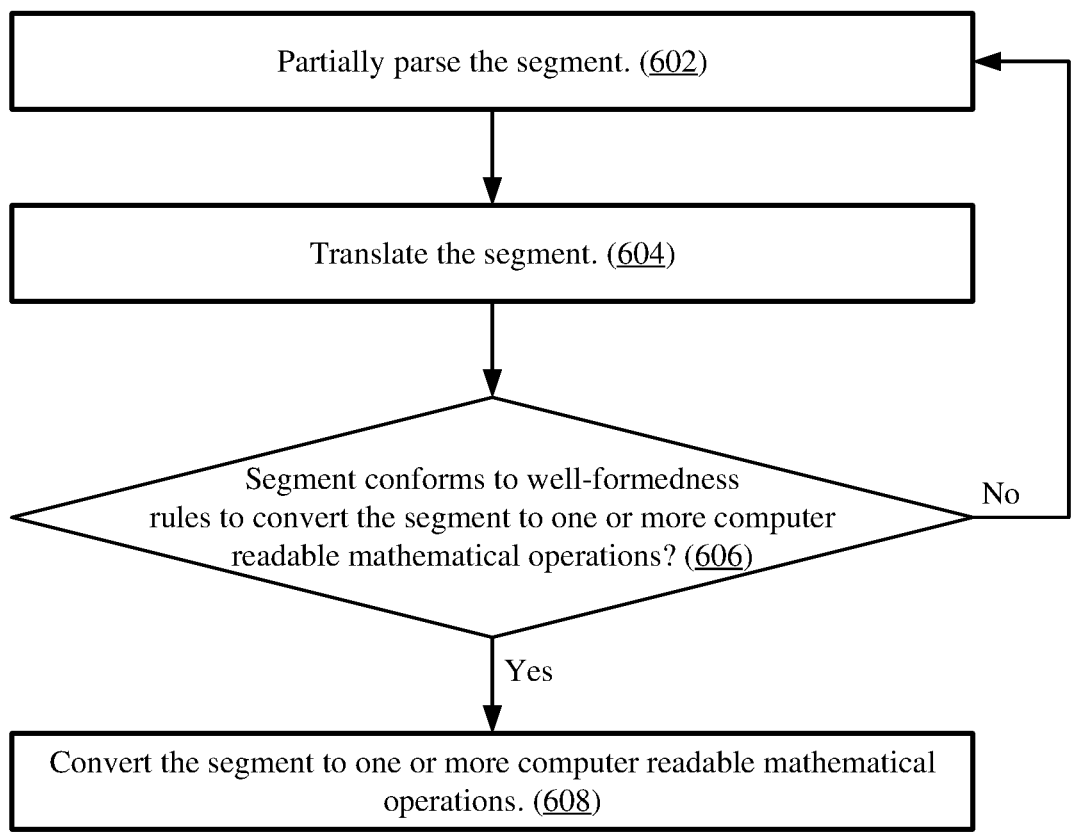
FIG. 6 shows an illustrative flow chart depicting an example operation for partially processing and translating a segment in a recursive manner until the segment can be converted to the one or more computer readable mathematical operations for output.

If the segment does not conform to well-formedness rules (such as segment (10)), another iteration of parsing and translation may be performed. FIG. 6 shows an illustrative flow chart depicting an example operation 600 for partially processing and translating a segment in a recursive manner until the segment can be converted to the one or more computer readable mathematical operations for output. At 602, the parsing engine 140 partially parses the segment. Step 602 may be similar to step 204 in FIG. 2. At 604, the translation engine 150 may translate the parsed segment. Step 604 may be similar to step 210 in FIG. 2. At decision 606, if the segment conforms to well-formedness rules to convert the segment to one or more computer readable mathematical operations, the system 100 may convert the segment to the one or more computer readable mathematical operations (608). At 606, if the segment does not conform to well-formedness rules, the process reverts to step 602. In this manner, the system 100 may recursively parse and translate the segment until the segment conforms to the well-formedness rules and is able to be converted to the one or more mathematical operations.

Referring back to the example of segment (10) above, the parsing engine 140 further parses the segment in the data structure after translation. Going from left to right, the parsing engine 140 uses lexical rules to replace "otherwise" with the operator "else" for the executable calculation. The parsing engine 140 also uses the lexical rules to replace the unigram "subtract" with the operator "sub" for the executable calculation. Additionally, the parsing engine 140 also uses the rules to convert "(line 24)" to "line(24)." At this state parsing of segment (10) results in segment (11) below.

(else(sub([no_subject],line(24),min(line(20),line (21)))))      (11)

In the target computer language, [no_subject] may not be translated. In this manner, segment (11) in its current form may not conform to well-formedness rules. However, as noted above, the third field is associated with the first field of the sub operation (such as by being associated with the unigram "from" in previous iterations of the segment). The parsing engine 140 may thus reorder the second field and the third field (with the first field removed). In this manner, the parsing engine 140 generates segment (12) below.

(else(sub(min(line(20),line(21)),line(24))))      (12)

Having parsed the segment a second time (with the changes and information stored in the data structure), the translation engine 150 translates and determines if the segment conforms to the well-formedness rules.

Referring back to FIG. 2, the system outputs one or more computer readable mathematical operations corresponding to the translated segment. Continuing the above example, translated segment (12) is well-formed and does not have further translation to be performed. As such, the system 100 outputs the one or more mathematical operations for segment (12) as "else(sub(min(line(20), line(21)), line(24)))"

(removing the outer brackets, with the segment in computer readable form for the target language).

In some implementations, the system 100 includes a classifier to determine whether a segment is an executable calculation candidate. In this manner, the system 100 flags segments as candidates before parsing, and the parsing engine 140 does not attempt to parse a segment not flagged as a candidate. In some implementations, the classification occurs during tokenization or lemmatization, and a segment is flagged if any token is associated with an executable calculation. For example, the below text includes multiple sentences that may be segmented but not classified as candidates.

> "If you had an eligible spouse, only one of you can claim the basic WITB. However, the individual who received the WIRB advance payments for 2017 is the individual who must claim the basic WITB for the year."

The two sentences may correspond to two segments. If tokenized into unigrams, none of the unigrams are associated with an executable calculation. Therefore, the system 100 may prevent parsing and further processing of the segments.

In contrast to determining that a segment is not to be parsed based on not being associated with an executable calculation, the system 100 may determine if a segment is too complex for parsing. In some implementations, the system 100 (such as the parsing engine 140) may perform a cursory or shallow parsing of a segment to identify whether parsing is to be performed (such as before step 204 in FIG. 2). If the segment is determined to be too complex, the system 100 prevents parsing and further processing of the segment. In some implementations, the system 100 may flag the segment or otherwise indicate that the segment requires further review outside of the automated system for converting segments to mathematical operations. In some implementations, the system 100 determines a complexity score for a segment, and compares the complexity score to a complexity threshold to determine whether the segment is to be parsed. The threshold may be static or adjustable (such as by a user or based on previous determinations whether segments are too complex for processing). The complexity score is based on the number of executable calculations in the segment and the hierarchy of the calculations. The complexity score may also be based on the type of operation to be performed (such as operations with more variables being considered more complex). In some implementations, the complexity score is based on an approximation of the number of iterations of parsing that may be needed to convert the segment to one or more mathematical operations. For example, segment (13) below is to be converted to instruction (14) below in the target computer language.

> "Enter the total of box 26 of all your t4 slips,maximum $55,900 per slip, where the province of employment is not Quebec." (13)

> add(filter(not(eq(province_of_employment,quebec)), max(55900,slip(t4,box(26)))))  (14)

The complexity score may be determined to be a 9, with the number of identified executable calculations being 6 and the number of multiple variable executable calculations being 3 (6+3=9). If the complexity threshold is lower than 9, the system 100 prevents further processing of the segment and flags the segment. If the complexity threshold is greater than 9, the system 100 continues with parsing and translation of the segment. In this manner, the system 100 filters which segments are to be processed for generating mathematical operation to be executed during execution of the financial management program.

Referring back to parsing and translation, some executable calculations may be embedded in text wherein expression are not relevant to the executable calculations. As a result, partially processing segments may allow such portions to remain unparsed while generating the one or more mathematical operations. For example, segment (15) below may be parsed and translated by the system 100.

> Enter the result as a decimal(rounded to at least three places). (15)

In parsing the segment from left to right, the first token associated with an executable calculation is "rounded." Therefore, the tokens subsequent to the identified token are associated and bracketed with the identified token ("rounded (to at least three places)"). The parsing engine 140 may thus ignore the tokens "enter the result as a decimal" preceding the identified token "rounded." For example, the parsing engine 140 may update the segment to remove the unigrams. In this manner, segment (15) is pruned to segment (16) below.

> round(to at least three places) (16)

The unigram "rounded" is lemmatized to the root word round (such as based on a grammar/dictionary). "Round" is the operator to generate a rounded decimal of a variable. Syntax of the operation may be defined in the target computer language as "round(variable, number of places)." Based on parsing rules, segment (16) is determined to include a rounding operation for a variable determined in a preceding segment. In this manner, the parsing engine 140 parses the segment to "round(variable, 3)". In this manner, not all of the segment is parsed, saving computing resources and time to generate the operations.

As noted above, the one or more mathematical operations generated by the computing system 100 (which may be in a PAS form) are to be executed during execution of a financial management program. In some implementations, execution of the mathematical operations cause the system 100 to generate one or more tax documents during execution of a tax preparation program. In this manner, the system 100 may ingest tax forms and instructions, convert the text in the forms and documents to operations to be performed in filling out a tax return, and generate and output the tax return documents. The system 100 may also use the interface 110 to submit the tax returns to the proper authorities upon completion.

As used herein, a phrase referring to "at least one of" or "one or more of" a list of items refers to any combination of those items, including single members. As an example, "at least one of: a, b, or c" or "one or more of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of converting natural language text in financial documents to mathematical operations for a financial management program, the method performed by one or more processors of a computing device and comprising:
    obtaining a first segment of computer readable text associated with a text capture in a financial document;
    parsing only a portion of the first segment to generate a parsed segment, wherein parsing only the portion of the first segment comprises not fully parsing the first segment;
    translating the parsed segment to generate a translated segment;
    determining whether the translated segment conforms to one or more well-formedness rules;
    wherein, in response to determining that the translated segment does not conform to the one or more well-formedness rules, recursively parsing additional portions of the first segment to update the parsed segment, translating the parsed segment, and determining whether the translated segment conforms to the one or more well-formedness rules after each iteration of parsing and translating until the translated segment conforms to the one or more well-formedness rules;
    wherein, in response to determining that the translated segment conforms to the one or more well-formedness rules, converting the translated segment to one or more computer readable mathematical operations; and
    outputting the one or more computer readable mathematical operations corresponding to the translated segment.

2. The method of claim 1, further comprising:
    capturing an image of text in the financial document;
    identifying text in the image;
    converting the text to the computer readable text; and
    segmenting the computer readable text into one or more segments including the first segment.

3. The method of claim 1, further comprising:
    tokenizing the first segment into a plurality of n-grams; and
    lemmatizing one or more n-grams of the plurality of n-grams based on a lexicon.

4. The method of claim 3, wherein parsing includes:
    analyzing each of the plurality of n-grams in order in the first segment to identify one or more n-grams associated with one or more operators for executable calculations; and
    for each of the one or more identified n-grams:
        associating one or more n-grams neighboring the identified n-gram with an executable calculation; and
        bracketing the one or more associated n-grams with the identified n-gram.

5. The method of claim 4, wherein:
    each executable calculation includes:
        an operator associated with the identified n-gram; and
        one or more variables associated with the one or more neighboring n-grams of the identified n-gram; and
    parsing further includes, for a bracket of one or more neighboring n-grams and the identified n-gram:
        identifying a first n-gram of the one or more neighboring n-grams as a first variable of the one or more variables based on a neighboring n-gram of the first n-gram; and
        ordering the one or more neighboring n-grams to associate the first n-gram with the first variable, wherein a data structure preserves the ordering of the one or more neighboring n-grams.

6. The method of claim 5, wherein parsing further includes, for the bracket of one or more neighboring n-grams and the identified n-gram:

determining that n-grams of the first segment preceding the bracket do not include an n-gram associated with an executable calculation; and excluding the n-grams preceding the bracket from further processing, wherein the preceding n-grams are not associated with the one or more computer readable mathematical operations.

7. The method of claim 5, wherein translating includes, for the bracket of one or more neighboring n-grams and the identified n-gram:

translating the identified n-gram into the associated operator; and translating the first n-gram into the first variable.

8. The method of claim 4, further comprising preventing further parsing and translating of a subset of consecutive n-grams in the first segment, wherein parsing includes determining that the subset of consecutive n-grams are not associated with any executable calculation.

9. The method of claim 1, further comprising:

obtaining a second segment of computer readable text associated with the text capture in the financial document;

determining that no n-grams of the second segment are associated with any executable calculation; and preventing further processing of the second segment in response to determining that no n-grams of the second segment are associated with any executable calculation.

10. The method of claim 1, further comprising executing the outputted one or more computer readable mathematical operations during execution of a financial management program.

11. The method of claim 10, wherein:

the financial management program includes a tax preparation application; and the financial document is a tax form or instructions associated with the tax form.

12. A system of converting natural language text in financial documents to mathematical operations for a financial management program, comprising:

one or more processors; and a memory storing instructions that, when executed by the one or more processors, causes the system to perform operations including:

obtaining a first segment of computer readable text associated with a text capture in a financial document;

parsing only a portion of the first segment to generate a parsed segment, wherein parsing only the portion of the first segment comprises not fully parsing the first segment;

translating the parsed segment to generate a translated segment;

determining whether the translated segment conforms to one or more well-formedness rules;

wherein, in response to determining that the translated segment does not conform to the one or more well-formedness rules, recursively parsing additional portions of the first segment to update the parsed segment, translating the parsed segment, and determining whether the translated segment conforms to the one or more well-formedness rules after each iteration of parsing and translating until the translated segment conforms to the one or more well-formedness rules;

wherein, in response to determining that the translated segment conforms to the one or more well-formedness rules, converting the translated segment to one or more computer readable mathematical operations; and outputting the one or more computer readable mathematical operations corresponding to the translated segment.

13. The system of claim 12, wherein execution of the instructions further causes the system to perform operations including:

tokenizing the first segment into a plurality of n-grams; and lemmatizing one or more n-grams based on a lexicon.

14. The system of claim 13, wherein parsing includes:

analyzing each of the plurality of n-grams in order in the first segment to identify one or more n-grams associated with one or more operators for executable calculations; and for each of the one or more identified n-grams:

associating one or more n-grams neighboring the identified n-gram with an executable calculation; and bracketing the one or more associated n-grams with the identified n-gram.

15. The system of claim 14, wherein:

each executable calculation includes:

an operator associated with the identified n-gram; and one or more variables associated with the one or more neighboring n-grams of the identified n-gram; and parsing further includes, for a bracket of one or more neighboring n-grams and the identified n-gram:

identifying a first n-gram of the one or more neighboring n-grams as a first variable of the one or more variables based on a neighboring n-gram of the first n-gram; and ordering the one or more neighboring n-grams to associate the first n-gram with the first variable, wherein a data structure preserves the ordering of the one or more neighboring n-grams.

16. The system of claim 15, wherein translating includes, for the bracket of one or more neighboring n-grams and the identified n-gram:

translating the identified n-gram into the associated operator; and translating the first n-gram into the first variable.

17. A non-transitory computer-readable medium storing instructions that, when executed by one or more processors of an apparatus, cause the apparatus to convert natural language text in financial documents to mathematical operations for a financial management program by performing operations comprising:

obtaining a first segment of computer readable text associated with a text capture in a financial document;

parsing only a portion of the first segment to generate a parsed segment, wherein parsing only the portion of the first segment comprises not fully parsing the first segment;

translating the parsed segment to generate a translated segment;

determining whether the translated segment conforms to one or more well-formedness rules;

wherein, in response to determining that the translated segment does not conform to the one or more well-formedness rules, recursively parsing additional portions of the first segment to update the parsed segment, translating the parsed segment, and determining whether the translated segment conforms to the one or more well-formedness rules after each iteration of parsing and translating until the translated segment conforms to the one or more well-formedness rules;

wherein, in response to determining that the translated segment conforms to the one or more well-formedness rules, converting the translated segment to one or more computer readable mathematical operations; and outputting the one or more computer readable mathematical operations corresponding to the translated segment.

\* \* \* \* \*